Feb. 16, 1937.  G. W. WALTER  2,070,938
OPHTHALMIC MOUNTING
Filed April 27, 1933
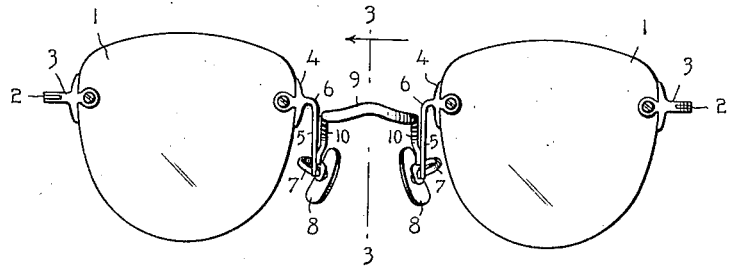
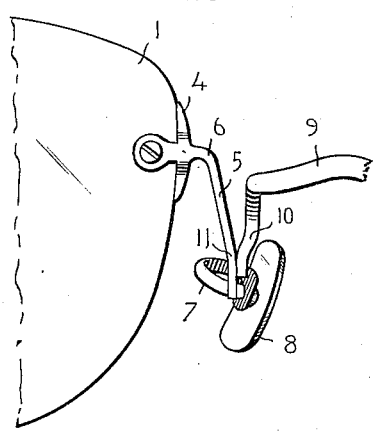
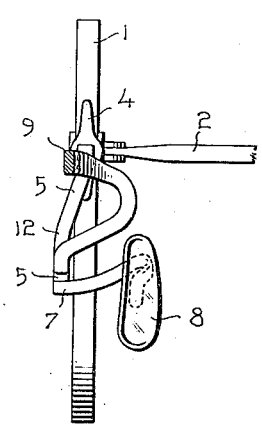
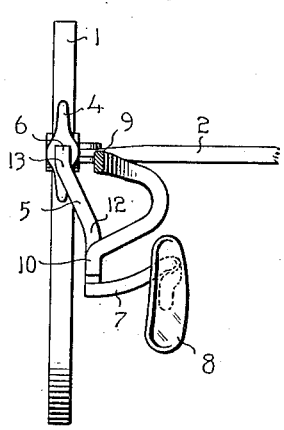
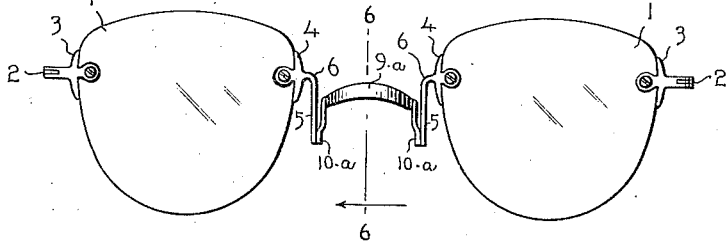
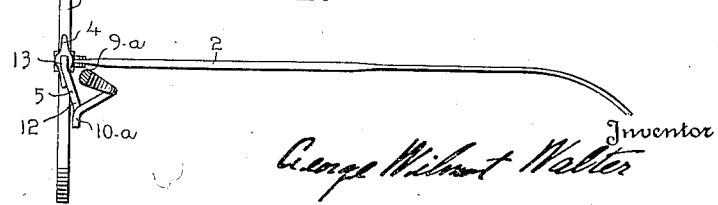

Patented Feb. 16, 1937

2,070,938

UNITED STATES PATENT OFFICE 2,070,938

OPHTHALMIC MOUNTING

George Wilmot Walter, Charleston, S. C.

Application April 27, 1933, Serial No. 668,245

1 Claim. (Cl. 88—42)

My invention consists in a new and useful improvement in ophthalmic mountings and is designed to provide a mounting in which each lens is independently adjustable, both laterally and transversely relative to the bridge, by the proper manipulation of a single member of the mounting. My improved mounting is designed more particularly for use with lenses having their nasal holes for the lens clamps drilled at points above the normal line of vision, requiring longer vertical supporting bars from the bridge, than in the ordinary type of mounting. The particularly novel and useful feature of my improved mounting is the provision of such vertical supporting bars which can be bent from their points of attachment to the bridge, to permit the desired adjustments of the lenses. These adjustments, which are made possible by the use of these vertical bars, eliminate the necessity of providing a variety of mountings having different forward-to-rear bridge measurements.

While I have illustrated in the drawing filed herewith and have hereinafter fully described certain specific embodiments of my invention, it is to be distinctly understood that I do not consider my invention limited to said specific embodiments, but refer for its scope to the claim appended hereto.

In the drawing:

Fig. 1 is a front elevation of a form of my improved mounting using nose pads.

Fig. 2 is a fragmentary enlarged front elevation, showing the supporting bar between the bridge and one of the lens clamps in a different lateral adjustment from that indicated in Fig. 1.

Fig. 3 is a vertical section on line 3—3 of Fig. 1.

Fig. 4 is a sectional view similar to Fig. 3, but showing the supporting bar in a different transverse adjustment from that indicated in Fig. 3.

Fig. 5 is a front elevation of a form of my improved mounting using the nose-supported bridge alone.

Fig. 6 is a vertical section on the line 6—6 of Fig. 5.

As illustrated in the drawing, my improved mounting has applied thereto the lenses 1 attached to the usual temple bars 2 by the usual lens clamps 3. Suitably positioned on the inner sides of the lenses 1, in the same horizontal plane as that of the clamps 3, which is above the focal points of the lenses 1, I provide the lens clamps 4 to each of which is attached the bar 5 having the bend 6. Each bar 5 has attached at its end the loop 7 carrying the nose pad 8. The bridge 9 has each of its ends 10 attached to the bars 5 respectively, at a point immediately above the junction of the bar 5 and the loop 7.

In the modified form of my mounting, illustrated in Figs. 5 and 6, the nose-supported bridge 9—a has its ends 10—a attached to the ends of the bars 5.

From the foregoing description, it is obvious that the lenses 1 are subject to independent adjustment both laterally and transversely, relative to the nose pads 8 and bridge 9, by bending the bars 5. Comparison of Figs. 1 and 2 shows how the left lens 1 can be moved outwardly by bending its bar 5 at the point 11, the bend 6 being slightly altered to align the lens clamps 3. Comparison of Figs. 3 and 4 shows how the left lens 1 can be moved forwardly, or backwardly, by bending the bar 5 at point 12, a complementary bend 13 being made to maintain the lens 1 vertical.

Having described my invention, what I claim is:

In an ophthalmic mounting, the combination of a pair of lens clamps, each comprising a pair of fingers to embrace the lens, and an abutment extended laterally on each side of said fingers against which the edge of the lens is positioned; a shank extended toward the middle of the mounting from each abutment, at right angles thereto, in the same plane with its lens; a rod extended downwardly from each shank; a bridge having a downwardly projected bar at each of its ends, each of said bars having an outwardly projected portion at its end, attached to one of said rods.

GEORGE WILMOT WALTER.